United States Patent
Li et al.

(10) Patent No.: US 9,819,172 B2
(45) Date of Patent: Nov. 14, 2017

(54) THERMAL PROTECTION CIRCUIT

(71) Applicant: Huawei Device Co., Ltd., Shenzhen (CN)

(72) Inventors: Changqi Li, Xi'an (CN); Bingwu Luo, Xi'an (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 219 days.

(21) Appl. No.: 14/753,245

(22) Filed: Jun. 29, 2015

(65) Prior Publication Data
US 2015/0303679 A1 Oct. 22, 2015

Related U.S. Application Data

(63) Continuation of application No. PCT/CN2014/073418, filed on Mar. 14, 2014.

(30) Foreign Application Priority Data

Apr. 8, 2013 (CN) .......................... 2013 1 0119670

(51) Int. Cl.
*H02H 5/04* (2006.01)
(52) U.S. Cl.
CPC .................................. *H02H 5/042* (2013.01)
(58) Field of Classification Search
CPC ............................................ H02H 5/04–5/044
See application file for complete search history.

(56) References Cited

U.S. PATENT DOCUMENTS

| 5,600,575 A | * | 2/1997 | Anticole | ................ H02H 6/005 330/146 |
| 5,798,667 A | * | 8/1998 | Herbert | .................. G06F 1/206 327/115 |

(Continued)

FOREIGN PATENT DOCUMENTS

| CN | 1864113 A | 11/2006 |
| CN | 2924879 Y | 7/2007 |

(Continued)

OTHER PUBLICATIONS

Dai, J., et al., "A Design of Thermal-Shutdown Circuit," Journal of Liaoning University, vol. 38, No. 1, Jan. 31, 2011, 3 pages.

(Continued)

*Primary Examiner* — Stephen W Jackson
*Assistant Examiner* — Christopher Clark
(74) *Attorney, Agent, or Firm* — Conley Rose, P.C.

(57) ABSTRACT

A thermal protection circuit which relates to the field of electronic technologies can detect temperature of multiple locations simultaneously and adjust a preset threshold flexibly, thereby improving system reliability. The thermal protection circuit includes: at least one temperature sensor, a detection circuit, an execution circuit, a self-locking and triggering circuit, a protective temperature regulation circuit, and a power supply circuit. The at least one temperature sensor converts a temperature signal into an electrical signal and sends the electrical signal to the detection circuit; the detection circuit detects whether temperature reaches the preset threshold, and sends a turn-off signal to the execution circuit if the temperature reaches the preset threshold; the execution circuit cuts off power supply to the system; and the self-locking and triggering circuit maintains, a power-off state of the system until a power switch is triggered.

19 Claims, 2 Drawing Sheets

(56) References Cited

U.S. PATENT DOCUMENTS 6,205,010 B1 3/2001 Oshaka et al.
6,555,796 B1 4/2003 Cusack

FOREIGN PATENT DOCUMENTS

| CN | 101026298 A | 8/2007 |
|---|---|---|
| CN | 201146378 Y | 11/2008 |
| GB | 2258929 A | 2/1993 |
| JP | 1993088142 U | 11/1993 |
| JP | H10145205 A | 5/1998 |
| WO | 2005013028 A1 | 2/2005 |

OTHER PUBLICATIONS

Foreign Communication From a Counterpart Application, Chinese Application No. 201310119670.0, Chinese Office Action dated May 19, 2016, 7 pages.
Partial English Translation and Abstract of Japanese Patent Application No. JPH10145205, Aug. 12, 2016, 66 pages.
Partial English Translation and Abstract of Japanese Patent Application No. JP05088142, Nov. 26, 1993, 5 pages.
Foreign Communication From a Counterpart, Japanese Application No. 2015-551120, Japanese Office Action dated Jul. 12, 2016, 4 pages.
Foreign Communication From a Counterpart, Japanese Application No. 2015-551120, English Translation of Japanese Office Action dated Jul. 12, 2016, 3 pages.
Foreign Communication From a Counterpart Application, PCT Application No. PCT/CN2014/073418, English Translation of International Search Report dated May 6, 2014, 2 pages.
Foreign Communication From a Counterpart Application, PCT Application No. PCT/CN2014/073418, Written Opinion dated May 6, 2014, 5 pages.
Foreign Communication From a Counterpart Application, European Application No. 14782412.2, Extended European Search Report dated Dec. 17, 2015, 7 pages.
Foreign Communication From a Counterpart Application, Chinese Application No. 201310119670.0, Chinese Office Action dated Feb. 4, 2017, 7 pages.

* cited by examiner

THERMAL PROTECTION CIRCUIT

CROSS-REFERENCE

This application is a continuation of International Application PCT/CN2014/073418, filed on Mar. 14, 2014, which claims priority to Chinese Patent Application No. 201310119670.0, filed on Apr. 8, 2013, both of which are hereby incorporated by reference in their entireties.

TECHNICAL FIELD

The present invention relates to the field of electronic technologies, and in particular, to a thermal protection circuit.

BACKGROUND

In a majority of terminals, lithium batteries are generally used to supply power to systems. Lithium is chemically active, and may lead to a fire or an explosion in a case of high temperature, an impact, or the like. Therefore, there are multiple protections for a lithium battery in a terminal.

In the prior art, an analog to digital converter (ADC) detection circuit may be used to detect temperature of a system, during which an ADC is controlled by a central processing unit (CPU). After the CPU detects that the temperature of the system exceeds a threshold, the CPU controls the system to take protection measures such as a shutdown and power-off. However, in cases in which the system crashes and so on, an effective protection cannot be implemented, thereby resulting in low reliability. Alternatively, when a chip of the system encounters a fault, similar to a latch fault, even if the CPU detects that the temperature exceeds the threshold, power supply to the system cannot be cut off; and alternatively, when the CPU itself is faulty, the power supply to the system cannot be cut off either, which leads to a protection failure.

SUMMARY

Embodiments of the present invention provide a thermal protection circuit which can detect temperature of multiple locations simultaneously, and adjust a preset threshold flexibly, thereby improving system reliability.

To achieve the foregoing objective, the embodiments of the present invention uses the following technical solutions.

According to a first aspect, a thermal protection circuit is provided, and the circuit includes at least one temperature sensor configured to convert a temperature signal into an electrical signal, and send the electrical signal to a detection circuit, the detection circuit, configured to detect, according to the electrical signal received from the temperature sensor, whether temperature reaches a preset threshold, and send a turn-off signal to an execution circuit if the temperature reaches the preset threshold, the execution circuit configured to cut off power supply to a system after receiving the turn-off signal from the detection circuit, and a self-locking and triggering circuit configured to maintain, after the power supply to the system is cut off, a power-off state of the system until a power switch is triggered.

With reference to the first aspect, in a first possible implementation manner, the temperature sensor is disposed outside a protected component, and a distance between the temperature sensor and the protected component is within a specified range, so that the protected component is within a monitoring range of the temperature sensor.

With reference to the first aspect or the first possible implementation manner of the first aspect, in a second possible implementation manner, the self-locking and triggering circuit includes a first diode, a second diode, a field effect transistor, a first resistor, and the power switch, a first end of the field effect transistor is connected to the temperature sensor, a second end of the field effect transistor is connected to the power supply circuit, a third end and a forth end of the field effect transistor are grounded, and the first resistor is connected to a connection point between the field effect transistor and the power supply circuit, and a cathode of the first diode is oppositely connected to a cathode of the second diode, an anode of the first diode is connected to a connection point between the temperature sensor and the field effect transistor, an anode of the second diode is connected to the power supply circuit, and the power switch is connected to a connection point between the cathode of the first diode and the cathode of the second diode.

With reference to the first aspect, the first possible implementation manner or the second possible implementation manner of the first aspect, in a third possible implementation manner, the detection circuit includes a comparing circuit, and the comparing circuit is an operational amplifier, a comparator, or a microcontroller; and a first input end of the comparing circuit is connected to a protective temperature regulation circuit, a second input end of the comparing circuit is connected to the temperature sensor, and an output end of the comparing circuit is connected to the execution circuit.

With reference to the first aspect or the first to third possible implementation manners of the first aspect, in a forth possible implementation manner, the execution circuit includes a field effect transistor or a load switch, and an first end of the execution circuit is connected to the detection circuit, a second end of the execution circuit is connected to the power supply circuit in which the protected component in the system is located, and a third end of the execution circuit is connected to a power source.

With reference to the first aspect or the first to forth possible implementation manners of the first aspect, in a fifth possible implementation manner, the thermal protection circuit further includes the protective temperature regulation circuit, so that the preset threshold is adjustable.

The embodiments of the present invention provide a thermal protection circuit which includes at least one temperature sensor that is configured to convert a temperature signal into an electrical signal, and send the electrical signal to a detection circuit; the detection circuit that is configured to detect, according to the electrical signal received from the temperature sensor, whether temperature reaches a preset threshold, and send a turn-off signal to an execution circuit if the temperature reaches the preset threshold; the execution circuit that is configured to cut off power supply to a system after receiving the turn-off signal from the detection circuit; a self-locking and triggering circuit that is configured to maintain, after the power supply to the system is cut off, a power-off state of the system until a power switch is triggered; and a protective temperature regulation circuit, so that the preset threshold is adjustable. In this way, temperature of multiple locations can be detected simultaneously, and the preset threshold can be adjusted flexibly, thereby improving system reliability.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
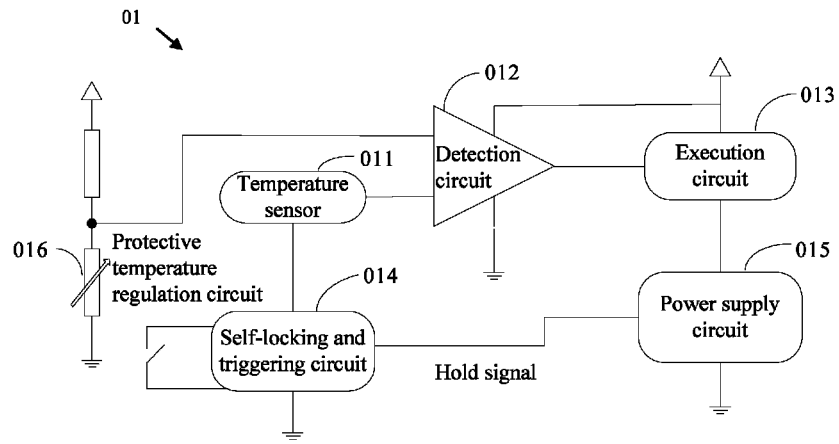
FIG. 1 is a schematic structural diagram of a thermal protection circuit according to an embodiment of the present invention.

An embodiment of the present invention provides a thermal protection circuit 01, and as shown in FIG. 1, the thermal protection circuit 01 includes at least one temperature sensor 011, a detection circuit 012, an execution circuit 013, a self-locking and triggering circuit 014, and a power supply circuit 015.

There may be at least one temperature sensor 011 which is configured to convert a temperature signal into an electrical signal and send the electrical signal to the detection circuit 012.

The detection circuit 012 is configured to detect, according to the electrical signal received from the temperature sensor 011, whether temperature reaches a preset threshold, and send a turn-off signal to the execution circuit 013 if the temperature reaches the preset threshold.

The execution circuit 013 is configured to cut off power supply to a system after receiving the turn-off signal from the detection circuit 012.

The self-locking and triggering circuit 014 is configured to maintain, after the power supply to the system is cut off, a power-off state of the system until a power switch is triggered.

The power supply circuit 015 is a load circuit borne on the thermal protection circuit 01.

In addition, the thermal protection circuit 01 may further include a protective temperature regulation circuit 016 that is configured to adjust the preset threshold, where the protective temperature regulation circuit 016 may be a component such as a variable resistor, and the preset threshold may be adjusted flexibly by changing a resistance of the variable resistor.

This embodiment of the present invention provides a thermal protection circuit 01 that cuts off power supply to a system automatically when temperature of the system is too high, and a method of the thermal protection circuit 01 is that at least one temperature sensor 011 converts a temperature signal into an electrical signal and sends the electrical signal to a detection circuit 012; the detection circuit 012 detects, according to the electrical signal, whether the temperature reaches a preset threshold and sends a turn-off signal to an execution circuit 013 if the temperature reaches the preset threshold; the execution circuit 013 cuts off power supply to the system; and a self-locking and triggering circuit 014 maintains, after the power supply to the system is cut off, a power-off state of the system until a power switch is triggered. The thermal protection circuit 01 may further include a protective temperature regulation circuit 016 that adjusts the preset threshold flexibly. Temperature of multiple locations can be detected simultaneously, and the preset threshold can be adjusted flexibly, thereby improving system reliability.

Figure 2:
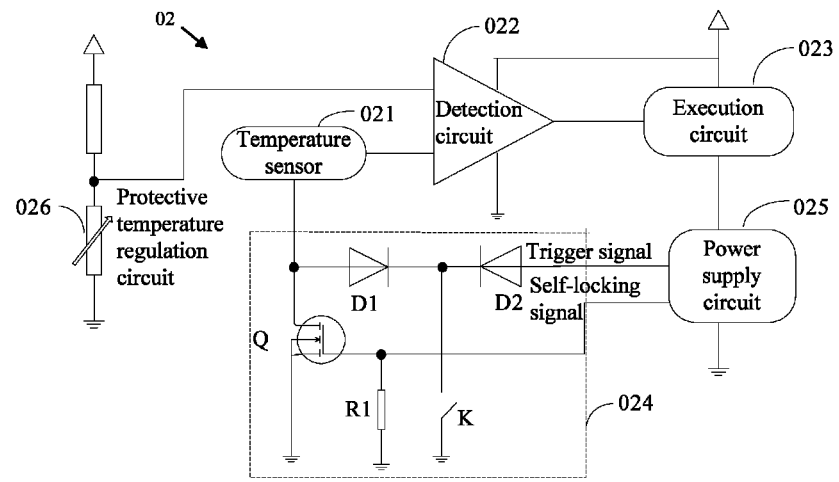
FIG. 2 is a schematic structural diagram of a thermal protection circuit according to another embodiment of the present invention.

Another embodiment of the present invention provides a thermal protection circuit 02, and as shown in FIG. 2, the thermal protection circuit 02 includes at least one temperature sensor 021, a detection circuit 022, an execution circuit 023, a self-locking and triggering circuit 024, and a power supply circuit 025, and may further includes a protective temperature regulation circuit 026.

The temperature sensor 021 is disposed outside a protected component, and a distance between the temperature sensor 021 and the protected component is within a specified range, so that the protected component is within a monitoring range of the temperature sensor 021.

The self-locking and triggering circuit 024 may include a first diode D1, a second diode D2, a field effect transistor Q, a first resistor R1 and a power switch K.

A first end of the field effect transistor Q is connected to the temperature sensor 021, a second end of the field effect transistor Q is connected to the power supply circuit 025, a third end and a fourth end of the field effect transistor Q are grounded, and the first resistor R1 is connected to a connection point between the field effect transistor Q and the power supply circuit 025.

A cathode of the first diode D1 is oppositely connected to a cathode of the second diode D2, an anode of the first diode D1 is connected to a connection point between the temperature sensor 021 and the field effect transistor Q, an anode of the second diode D2 is connected to the power supply circuit 025, and the power switch K is connected to a connection point between the cathode of the first diode D1 and the cathode of the second diode D2.

Exemplarily, when the field effect transistor Q is an N-channel field effect transistor, a gate (G electrode) of the N-channel field effect transistor is connected to a processor in the power supply circuit 025 or a power source, a drain (D electrode) of the N-channel field effect transistor is connected to the multiple temperature sensors 021, and a source (S electrode) and a shielding electrode of the N-channel field effect transistor are grounded.

The detection circuit 022 may include a comparing circuit, and the comparing circuit may be an operational amplifier, a comparator, a microcontroller, or the like.

A first input end of the comparing circuit is connected to the protective temperature regulation circuit 026, a second input end of the comparing circuit is connected to the temperature sensor 021, and an output end of the comparing circuit is connected to the execution circuit 023.

The execution circuit 023 may include a field effect transistor or a load switch.

A first end of the execution circuit 023 is connected to the detection circuit 022, a second end of the execution circuit 023 is connected to the power supply circuit 025 in which the protected component in the system is located, and a third end of the execution circuit 023 is connected to the power source.

The execution circuit 023 is connected to the detection circuit 022 to form a loop, and after the execution circuit 023 processes a signal detected by the detection circuit 022, the execution circuit 023 may be controlled to start or cut off power supply to the power supply circuit 025.

The protective temperature regulation circuit 026 may be a component such as a variable resistor, so that a preset threshold can be adjusted flexibly by changing a resistance value of the variable resistor.

An operating principle of the thermal protection circuit 02 is that at least one temperature sensor 021 converts a temperature signal into an electrical signal, where the electrical signal is a signal used to indicate voltage, and sends the electrical signal to the detection circuit 022; the detection circuit 022 detects, according to the electrical signal sent by the temperature sensor 021, whether temperature reaches a preset threshold; when the temperature is within a range of the preset threshold, the detection circuit 022 takes no action, and the system works normally; when the temperature reaches the preset threshold, the detection circuit 022 sends a turn-off signal to the execution circuit 023, the execution circuit 023 cuts off power supply to the system after receiving the turn-off signal from the detection circuit 022, and the self-locking and triggering circuit 024 is configured to maintain, after the power supply to the system is cut off, a power-off state of the system until the power switch K is triggered to start power supply to the system. In this way, the hardware-based thermal protection circuit 02 can detect temperature of multiple locations simultaneously, and cut off power supply automatically when the temperature is too high, thereby improving system reliability.

Figure 3:
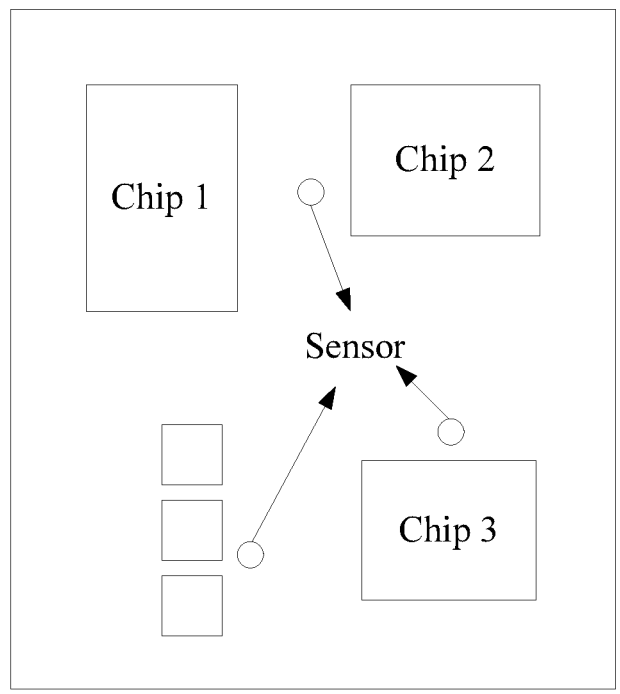
FIG. 3 is a schematic distribution diagram of another sensor according to still another embodiment of the present invention.

Exemplarily, the temperature sensor 021 may include multiple groups of sensor arrays, and the multiple sensors are distributed at key positions (key chips) of a printed circuit board (PCB), as shown in FIG. 3. The multiple sensors are connected in parallel, and when one of the sensors detects that the temperature exceeds the preset threshold or when N sensors simultaneously detect that the temperature exceeds the preset threshold, the system may start a protection action, which is beneficial for providing protection for the entire system. For example, the preset threshold is set to 95 degrees, and when one sensor detects that temperature of a chip in the power supply circuit 025 exceeds 95 degrees, the thermal protection circuit 02 starts a protection action; or when three of the sensors detect simultaneously that temperature of a chip reaches 95 degrees, the thermal protection circuit starts a protection action. Generally, N may be 3, or may be another value, and no limitation is imposed herein. The temperature sensor 021 may be an negative temperature coefficient (NTC) thermistor, a positive temperature coefficient (PTC) thermistor, a semiconductor sensor, or the like. The number of sensors may be one or more, and in this way, temperature of the multiple locations on the printed circuit board (PCB) may be detected simultaneously. The larger number of sensors indicates a larger protection scope and more detailed temperature detection.

The detection circuit 022 may be implemented by using hardware, for example, an applied comparing circuit may be a differential amplifier, a microcontroller, or the like, so that a protection failure caused by a software crash is avoided.

The execution circuit 023 generally includes a metal-oxide-semiconductor field-effect transistor (MOS-FET) or a load switch. When the system works normally, the MOS-FET or the load switch is on to normally provide power supply for the system; and when the temperature of the system reaches the preset threshold, the MOS-FET or the loadswitch is shut down automatically under the control of the detection circuit 022, so as to cut off power supply to the chip of the system.

After the power supply to the system is cut off, the self-locking and triggering circuit 024 may maintain the power-off state to avoid that power supply to the system is restarted because of a decrease of the temperature, and the temperature is caused to rise again, thereby resulting in a cycle between restart and cut-off After temperature detected by at least one sensor of the temperature sensors 021 reaches the preset threshold and the power supply to the system is therefore cut off, the self-locking and triggering circuit 024 withdraws a self-locking signal from the power supply circuit 025 to maintain the system is in the power-off state. That the system is restarted to enter a cyclic state because of a decrease of the temperature is avoided, unless a user retriggers the power switch K.

Secondly, the self-locking and triggering circuit 024 may further ensure that the system is powered on to work normally. The field effect transistor Q may implement a self-locking function of a self-locking and triggering circuit 024, so that the thermal protection circuit 02 is in an on state. The first diode D1 and the second diode D2 play a role of connection, and may further prevent improper flowing of a current between the self-locking and triggering circuit 024 and the power supply circuit 025. After the power supply circuit 025 is powered on to work, a hold signal is output to the field effect transistor Q, so that the field effect transistor Q may implement the self-locking function of the self-locking and triggering circuit 024. The hold signal herein may be sent to the field effect transistor Q by the processor in the power supply circuit 025 or input/output (I/O) of another similar element.

When the system needs to be powered on again, the field effect transistor Q in the self-locking and triggering circuit 024 is turned on when the power switch K is pressed, to implement the self-locking function, and outputs a reference level to the detection circuit 022. When the power supply to the system is cut off and the power supply circuit 025 detects that a user is about to shut down the system, an I/O state of the processor in the power supply circuit 025 changes the field effect transistor Q from an on state to an off state, that is, the power supply circuit 025 withdraws the self-locking signal, and the power supply circuit is powered off to enter a standby state, and waits to be triggered and powered on again. The first diode D1 and the second diode D2 further play a role of preventing a current from flowing backwards.

It can be learned that a trigger circuit is configured to trigger a process from a shutdown of the system to starting of the system, and the self-locking and triggering circuit 024 is in charge of maintaining the system running and implementing a process from the starting of the system to the shutdown of the system.

According to the foregoing descriptions, the thermal protection circuit 02 of the present invention may include three working states: a shutdown state, an in-operation state, and a protection state. The shutdown state may be that: after the system is shut down, the self-locking and triggering circuit 024 controls the detection circuit 022 to adjust automatically a state of the detection circuit 022, so that the detection circuit 022 turns off the MOS-FET or the load switch in the execution circuit 023. In this case, the power supply circuit 025 is powered off. In the shutdown state, only the hardware-based thermal protection circuit 02 works, and the power supply circuit 025 is powered off. In this way, a leakage current may be reduced, which is particularly important to a battery device and can effectively increase a storage time during a shutdown. When the power supply circuit 025, namely a protected circuit, is powered off, a possible short circuit risk can be avoided, so that the system can be more secure.

Exemplarily, when triggering turning off of the power switch K, the user presses the power switch K. When detecting that the user is about to perform a shutdown, the power supply circuit 025 first saves a setting such as data storage, and then changes strength of a control signal of the self-locking and triggering circuit 024 from high to low, where the power supply circuit 025 may control a self-locking signal by using I/O of the processor, so that the field effect transistor Q is changed from the on state to the off state. The self-locking and triggering circuit 024 outputs a turn-off signal to the detection circuit 022, so that a state of the detection circuit 022 is changed accordingly. The detection circuit 022 outputs the turn-off signal to the execution circuit 023, and the execution circuit 023 cuts off the power supply to the power supply circuit 025. In this case, the entire protection circuit returns to a state that is before the system is started. When the system is in the shutdown state, only the thermal protection circuit 02 works, and the power supply circuit 025 is powered off; or neither of the thermal protection circuit 02 and the power supply circuit 025 works.

The in-operation state is that: after the power switch K in the self-locking and triggering circuit 024 is triggered to be closed, the power supply circuit 025 may be powered on and work. Before the switch K that triggers the system to be powered on is released, the first diode D1 and the second diode D2 that are in the self-locking and triggering circuit 024 are on, and a trigger signal is sent to the power supply circuit 025, an I/O port of the processor or of another processor-like element in the power supply circuit 025 outputs a hold signal to the field effect transistor Q in the self-locking and triggering circuit 024 to maintain a system-is-on state, where the system-is-on state may be maintained by providing a specific reference level to the comparing circuit in the detection circuit 022 by means of on or off of the field effect transistor Q, or may be maintained in another manner, and no limitation is imposed herein. After the power supply circuit 025 outputs the hold signal, the switch K that triggers the system to be powered on may be released, and the system completes a power-on process and works normally.

When the field effect transistor Q is an enhanced N-channel field effect transistor (NMOS), the field effect transistor Q is on when a G electrode (gate) of the field effect transistor Q is at a high level, so that the hold signal herein may be at a high level. When the field effect transistor Q is an enhanced P-channel field effect transistor (PMOS), the hold signal may also be at a low level, and no limitation is imposed herein. There are four ends of connection points in the power supply circuit 025. A first end is grounded. A second end is connected to the diode in the self-locking and triggering circuit 024, and is configured to output the hold signal to the self-locking and triggering circuit 024. A third end is a to-be-triggered system starting end, is connected to the field effect transistor Q in the self-locking and triggering circuit 024, and is configured to be triggered, by the field effect transistor Q, to be powered on. The fourth end is a power supply end and connected to the execution circuit 023, where the execution circuit 023 controls power-on and power-off of the power supply circuit 025.

The protection state may be that the temperature sensor 021 converts a temperature signal into a voltage signal, and sends the voltage signal to the detection circuit 022. If the detection circuit 022 detects, according to the voltage signal received from the temperature sensor 021, the temperature reaches the preset threshold, the detection circuit 022 is triggered and send a turn-off signal to the MOS-FET or the load switch in the execution circuit 023, so that the MOS-FET or load switch is turned off, and the system enters the shutdown state. Therefore, a shutdown state is maintained. Unless the user closes the switch K again to trigger power-on of the system, the system is not automatically powered on again even if the temperature of the system decreases below the preset threshold. In this way, a cycle of overtemperature—off—cooling—starting—overtemperature—off . . . can be avoided.

This embodiment of the present invention provides a thermal protection circuit, and the thermal protection circuit includes at least one temperature sensor, a detection circuit, an execution circuit, a self-locking and triggering circuit, and a power supply circuit. The at least one temperature sensor detects temperature of multiple locations simultaneously, converts a temperature signal into an electrical signal, and sends the electrical signal to the detection circuit. The detection circuit detects, according to the electrical signal, whether the temperature reaches a preset threshold, and sends a turn-off signal to an execution circuit if the temperature reaches the preset threshold; and the execution circuit cuts off power supply to a system. The self-locking and triggering circuit can ensure normal power-on and power-off of the system, and maintain, after the system is powered off due to overtemperature, a power-off state of the system until a power switch is triggered. The thermal protection circuit may further include a protective temperature regulation circuit, so that the preset threshold may be adjusted flexibly by changing a resistance value of a variable resistor. In this way, the thermal protection circuit can avoid low reliability of software-based protection in a hardware-based protection manner, can detect temperature of multiple locations simultaneously, and can adjust the preset threshold flexibly, thereby improving system reliability.

In the several embodiments provided in the present application, it should be understood that the disclosed circuit may be implemented in other manners. For example, the described device embodiment is merely exemplary. For example, unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, function units in the embodiments of the present invention may be integrated into one processing unit, or each of the units may exist alone physically, or two or more units are integrated into one unit. The foregoing units may be implemented in a form of hardware, or may be implemented in a form of hardware in addition to a software function unit.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A thermal protection circuit for a system, comprising:
   a detection circuit;
   an execution circuit;
   a self-locking and triggering circuit; and
   at least one temperature sensor, wherein the temperature sensor is configured to:
      convert a temperature signal into an electrical signal; and
      send the electrical signal to the detection circuit,
   wherein the detection circuit is coupled to the temperature sensor and configured to:
      detect, according to the electrical signal, whether a temperature of the system reaches a preset threshold temperature; and
      send a turn-off signal to an execution circuit when the temperature reaches the preset threshold temperature,
   wherein the execution circuit is coupled to the detection circuit and configured to cut off power to the system after receiving the turn-off signal, and
   wherein the self-locking and triggering circuit is coupled to a power supply circuit and comprises:
      a first diode;
      a second diode coupled to the first diode;
      a field-effect transistor coupled to the temperature sensor; and
      a power switch coupled to each of the first and the second diodes, wherein the power switch is connected to a first connection point between a cathode of the first diode and a cathode of the second diode, wherein an anode of the first diode is connected to a second connection point between the temperature sensor and the field-effect transistor, and wherein an anode of the second diode is connected to the power supply circuit.

2. The thermal protection circuit according to claim 1, wherein the temperature sensor is disposed outside a protected component, and wherein a distance between the temperature sensor and the protected component is within a specified range so that the protected component is within a monitoring range of the temperature sensor.

3. The thermal protection circuit according to claim 1, wherein the self-locking and triggering circuit further comprises a first resistor with a first and a second resistor terminal, wherein the first resistor terminal is coupled to ground and the second resistor terminal is connected to a third connection point between the field effect transistor and the power supply circuit, wherein a first end of the field effect transistor is connected to the temperature sensor, wherein a second end of the field effect transistor is connected to the power supply circuit, and wherein a third and a fourth end of the field effect transistor are connected to the ground.

4. The thermal protection circuit according to claim 1, wherein the detection circuit comprises a comparing circuit, wherein the comparing circuit comprises a comparator, wherein a first input end of the comparing circuit is connected to a protective temperature regulation circuit, and wherein a second input end of the comparing circuit is connected to the temperature sensor, and wherein an output end of the comparing circuit is connected to the execution circuit.

5. The thermal protection circuit according to claim 1, wherein the detection circuit comprises a comparing circuit, wherein the comparing circuit comprises a microcontroller, wherein a first input end of the comparing circuit is connected to a protective temperature regulation circuit, and wherein a second input end of the comparing circuit is connected to the temperature sensor, and wherein an output end of the comparing circuit is connected to the execution circuit.

6. The thermal protection circuit according to claim 2, wherein the execution circuit comprises a field effect transistor, wherein a first end of the execution circuit is connected to the detection circuit, wherein a second end of the execution circuit is connected to the power supply circuit in which the protected component in the system is located, and wherein a third end of the execution circuit is connected to a power source.

7. The thermal protection circuit according to claim 2, wherein the execution circuit comprises a load switch, wherein a first end of the execution circuit is connected to the detection circuit, wherein a second end of the execution circuit is connected to the power supply circuit in which the protected component in the system is located, and wherein a third end of the execution circuit is connected to a power source.

8. The thermal protection circuit according to claim 1, further comprising a protective temperature regulation circuit, wherein the protective temperature regulation circuit is configured to adjust the preset threshold temperature.

9. The thermal protection circuit according to claim 1, wherein the self-locking and triggering circuit is configured to maintain, after the power to the system is cut off, a power-off state of the system until the power switch is triggered.

10. The thermal protection circuit according to claim 1, wherein the detection circuit comprises a comparing circuit, wherein the comparing circuit comprises an operational amplifier, and wherein a first input end of the comparing circuit is connected to a protective temperature regulation circuit, a second input end of the comparing circuit is connected to the temperature sensor, and an output end of the comparing circuit is connected to the execution circuit.

11. A thermal protection circuit for a system, comprising:
   at least one temperature sensor, wherein the temperature sensor is configured to convert a temperature signal into an electrical signal;
   a detection circuit coupled to the temperature sensor and configured to generate a turn-off signal when a temperature of the system reaches a preset threshold temperature;
   an execution circuit coupled to the detection circuit and configured to cut off power to the system according to the turn-off signal, and
   a self-locking and triggering circuit coupled to a power supply circuit and configured to maintain a power-off state of the system until a power switch is triggered, wherein the self-locking and triggering circuit comprises:
      a first diode;
      a second diode coupled to the first diode;
      a field-effect transistor coupled to the temperature sensor; and
      wherein the power switch is coupled to each of the first and the second diodes, wherein the power switch is connected to a first connection point between a cathode of the first diode and a cathode of the second diode, wherein an anode of the first diode is connected to a second connection point between the temperature sensor and the field-effect transistor, and wherein an anode of the second diode is connected to the power supply.

12. The thermal protection circuit according to claim 11, wherein the temperature sensor is disposed outside a protected component, and wherein a distance between the temperature sensor and the protected component is within a specified range so that the protected component is within a monitoring range of the temperature sensor.

13. The thermal protection circuit according to claim 11, wherein the self-locking and triggering circuit further comprises a first resistor with a first and a second resistor terminal, wherein the first resistor terminal is coupled to ground and the second resistor terminal is connected to a third connection point between the field effect transistor and a power supply circuit, wherein a first end of the field effect transistor is connected to the temperature sensor, wherein a second end of the field effect transistor is connected to the power supply circuit, and wherein a third and a fourth end of the field effect transistor are connected to the ground.

14. The thermal protection circuit according to claim 11, wherein the detection circuit comprises a comparing circuit, wherein the comparing circuit comprises a comparator, wherein a first input end of the comparing circuit is connected to a protective temperature regulation circuit, and wherein a second input end of the comparing circuit is connected to the temperature sensor, and wherein an output end of the comparing circuit is connected to the execution circuit.

15. The thermal protection circuit according to claim 11, wherein the detection circuit comprises a comparing circuit, wherein the comparing circuit comprises a microcontroller, wherein a first input end of the comparing circuit is connected to a protective temperature regulation circuit, and wherein a second input end of the comparing circuit is connected to the temperature sensor, and wherein an output end of the comparing circuit is connected to the execution circuit.

16. The thermal protection circuit according to claim 11, wherein the detection circuit comprises a comparing circuit, wherein the comparing circuit comprises an operational amplifier, and wherein a first input end of the comparing circuit is connected to a protective temperature regulation circuit, a second input end of the comparing circuit is connected to the temperature sensor, and an output end of the comparing circuit is connected to the execution circuit.

17. The thermal protection circuit according to claim 12, wherein the execution circuit comprises a field effect transistor, wherein a first end of the execution circuit is connected to the detection circuit, wherein a second end of the execution circuit is connected to the power supply circuit in which the protected component in the system is located, and wherein a third end of the execution circuit is connected to a power source.

18. The thermal protection circuit according to claim 12, wherein the execution circuit comprises a load switch, wherein a first end of the execution circuit is connected to the detection circuit, wherein a second end of the execution circuit is connected to the power supply circuit in which the protected component in the system is located, and wherein a third end of the execution circuit is connected to a power source.

19. The thermal protection circuit according to claim 11, further comprising a protective temperature regulation circuit, wherein the protective temperature regulation circuit is configured to adjust the preset threshold temperature.

\* \* \* \* \*